US010223034B2

(12) United States Patent
Lee et al.

(10) Patent No.: US 10,223,034 B2
(45) Date of Patent: *Mar. 5, 2019

(54) BLOCK STORAGE USING A HYBRID MEMORY DEVICE

(71) Applicant: MICROSOFT TECHNOLOGY LICENSING, LLC, Redmond, WA (US)

(72) Inventors: Scott Chau-Chueh Lee, Bellevue, WA (US); Robin A. Alexander, Woodinville, WA (US); Lee E. Prewitt, Mercer Island, WA (US); Chiuchin Chen, Bellevue, WA (US); Vladimir Sadovsky, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/040,427

(22) Filed: Jul. 19, 2018

(65) Prior Publication Data

US 2018/0321881 A1 Nov. 8, 2018

Related U.S. Application Data

(63) Continuation of application No. 15/340,506, filed on Nov. 1, 2016, which is a continuation of application No. 13/862,104, filed on Apr. 12, 2013, now Pat. No. 9,552,176.

(51) Int. Cl.
*G06F 3/06* (2006.01)

(52) U.S. Cl.
CPC .......... *G06F 3/0659* (2013.01); *G06F 3/0604* (2013.01); *G06F 3/0605* (2013.01); *G06F 3/068* (2013.01); *G06F 3/0646* (2013.01); *G06F 3/0685* (2013.01)

(58) Field of Classification Search
CPC .. G06F 12/0246; G06F 3/0604; G06F 3/0605; G06F 3/0646; G06F 3/0659; G06F 3/068; G06F 3/0685
USPC ................... 711/103, 115; 715/837
See application file for complete search history.

(56) References Cited

U.S. PATENT DOCUMENTS

| 7,681,007 | B2 * | 3/2010 | Rustagi | G06F 3/0605 711/112 |
| 2002/0083264 | A1 * | 6/2002 | Coulson | G06F 3/0613 711/112 |
| 2005/0156037 | A1 * | 7/2005 | Wurzburg | G06F 3/0481 235/435 |

(Continued)

*Primary Examiner* — Yaima Rigol
(74) *Attorney, Agent, or Firm* — Newport IP, LLC; Han K. Gim

(57) ABSTRACT

Techniques for block storage using a hybrid memory device are described. In at least some embodiments, a hybrid memory device includes a volatile memory portion, such as dynamic random access memory (DRAM). The hybrid memory device further includes non-volatile memory portion, such as flash memory. In at least some embodiments, the hybrid memory device can be embodied as a non-volatile dual in-line memory module, or NVDIMM. Techniques discussed herein employ various functionalities to enable the hybrid memory device to be exposed to various entities as an available block storage device.

20 Claims, 6 Drawing Sheets

(56) References Cited

U.S. PATENT DOCUMENTS

| | | | |
|---|---|---|---|
| 2006/0241930 A1* | 10/2006 | Oshins | G01R 31/318357 703/24 |
| 2007/0106762 A1* | 5/2007 | Kim | H04N 5/76 709/219 |
| 2007/0106764 A1* | 5/2007 | Mansfield | H04L 12/2803 709/220 |
| 2007/0192563 A1* | 8/2007 | Rajan | G06F 12/0292 711/202 |
| 2007/0276994 A1* | 11/2007 | Caulkins | G06F 3/061 711/113 |
| 2009/0132760 A1* | 5/2009 | Flynn | G06F 3/0613 711/113 |
| 2010/0030981 A1* | 2/2010 | Cook | G06F 12/0866 711/159 |
| 2010/0037017 A1* | 2/2010 | Ryu | G06F 3/061 711/112 |
| 2010/0250963 A1* | 9/2010 | Furuichi | G06F 21/10 713/189 |
| 2012/0059972 A1* | 3/2012 | Chen | G06F 12/0246 711/4 |

* cited by examiner

_US 10,223,034 B2_

BLOCK STORAGE USING A HYBRID MEMORY DEVICE

RELATED APPLICATIONS

This application is a continuation of and claims priority to U.S. patent application Ser. No. 15/340,506, entitled "Block Storage Using a Hybrid Memory Device" and filed Nov. 1, 2016, which claims priority to U.S. patent application Ser. No. 13/862,104, entitled "Block Storage Using a Hybrid Memory Device" and filed Apr. 12, 2013, the disclosures of which are incorporated by reference herein in its entirety.

BACKGROUND

Computing devices typically utilize a variety of different memory and data storage devices. Recently, hybrid memory devices have become available that implement a combination of memory (e.g., volatile memory such as dynamic random access memory (DRAM)) and storage, e.g., non-volatile memory. One example of such a hybrid memory device is a non-volatile dual in-line memory module, or NVDIMM. While these devices can be useful in certain scenarios, current implementations limit ways in which the devices can be accessed and utilized by users and system resources.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for block storage using a hybrid memory device are described. In at least some embodiments, a hybrid memory device includes a volatile memory portion, such as dynamic random access memory (DRAM). The hybrid memory device further includes non-volatile memory portion, such as flash memory. In at least some embodiments, the hybrid memory device can be embodied as a non-volatile dual in-line memory module, or NVDIMM. Techniques discussed herein employ various functionalities to enable the hybrid memory device to be exposed to various entities as an available block storage device.

For instance, in at least some embodiments a hybrid memory device can be exposed to users as an available storage device. Users, for example, can be presented with a visual representation of a storage device, such as including the hybrid storage device in a list of disk devices available to a user, as a visual icon that represents the hybrid storage device, and so forth. Users can interact with the visual representation to save data to and/or access data from the hybrid memory device, such as by dragging and dropping files to the visual representation.

In at least some embodiments, a hybrid memory device can be exposed to resources as an available storage device. Examples of such resources include applications, services, processes (e.g., threads), devices, and so forth. Thus, resources can access the storage device to perform data operations, such as writing data to non-volatile storage of the hybrid memory device, accessing data from the non-volatile storage, and so on. As detailed below, resources can utilize a hybrid memory device for various tasks, such as data backup, failure diagnosis, system recovery, and so forth. Further implementations and details are presented below.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques for block storage using a hybrid memory device are described. In at least some embodiments, a hybrid memory device includes a volatile memory portion, such as dynamic random access memory (DRAM). The hybrid memory device further includes non-volatile memory portion, such as flash memory. In at least some embodiments, the hybrid memory device can be embodied as a non-volatile dual in-line memory module, or NVDIMM. Techniques discussed herein employ various functionalities to enable the hybrid memory device to be exposed to various entities as an available block storage device.

For instance, in at least some embodiments a hybrid memory device can be exposed to users as an available storage device. Users, for example, can be presented with a visual representation of a storage device, such as a visual icon that represents the hybrid storage device. Users can interact with the visual representation to save data to and/or access data from the hybrid memory device, such as by dragging and dropping files to the visual representation.

In at least some embodiments, a hybrid memory device can be exposed to resources as an available storage device. Examples of such resources include applications, services, processes (e.g., threads), devices, and so forth. Thus, resources can access the storage device to perform data operations, such as writing data to non-volatile storage of the hybrid memory device, accessing data from the non-volatile storage, and so on. As detailed below, resources can utilize a hybrid memory device for various tasks, such as for general data storage, data backup, failure diagnosis, system recovery, and so forth. Further implementations and details are presented below.

In the following discussion, an example environment is first described that is operable to employ techniques described herein. Next, a section entitled "Identification Scheme" discussed an example scheme for generating identifiers for hybrid memory devices in accordance with one or more embodiments. Following this, a section entitled "Example Procedures" describes some example methods in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

Figure 1:
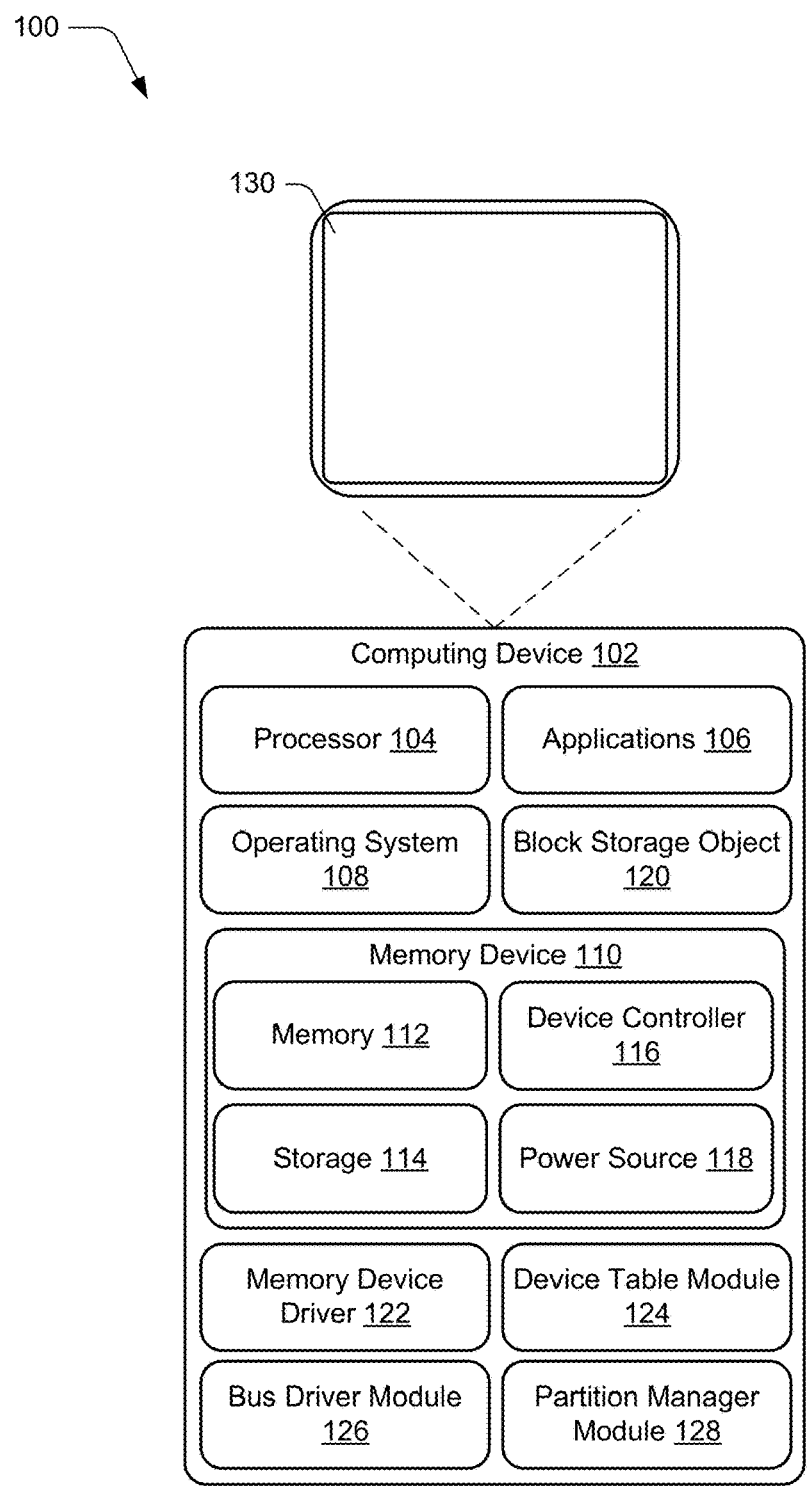
FIG. 1 is an illustration of an environment in an example implementation that is operable to employ techniques discussed herein.

FIG. 1 is an illustration of an environment 100 in an example implementation that is operable to employ techniques for block storage using a hybrid memory device described herein. The illustrated environment 100 includes a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device (e.g., a tablet), and so forth as further described in relation to FIG. 8.

Computing device 102 includes a processor 104, which is representative of functionality to perform various types of data processing for the computing device 102. For example, the processor 104 can represent a central processing unit (CPU) of the computing device 102. Further examples of implementations of the processor 104 are discussed below with reference to FIG. 8.

The computing device 102 further includes applications 106, which are representative of functionalities to perform various tasks via the computing device 102. Examples of the applications 106 include a word processor application, an email application, a content editing application, a web browsing application, and so on. These examples are provided for purpose of illustration only, and the applications 106 can generally represent any service that can performs tasks and/or operations via the computing device 102.

An operating system 108 is included, which is representative of functionality to manage and provide access to various resources of the computing device 102.

The computing device 102 further includes a hybrid memory device 110, which includes a combination of volatile memory and non-volatile memory. The hybrid memory device 110, for example, can represent an instance of a non-volatile dual in-line memory module device, or NVDIMM. The hybrid memory device 110 includes a memory 112, which is representative of a volatile data storage medium that can be written to and read from by various functionalities of the computing device 102. The memory 112, for example, can represent a primary memory of the computing device 102 that can employed as data storage for processes running on the computing device 102. Examples of the memory 112 include various types of random access memory (RAM), such as dynamic random access memory (DRAM).

The hybrid memory device 110 further includes storage 114, which is representative of a non-volatile medium for data storage. The storage 114, for example, can be implemented as flash memory. Various other types of non-volatile storage may be utilized, examples of which are discussed below with reference to FIG. 8.

The hybrid memory device 110 also includes a device controller 116 and a power source 118. The device controller 116 is representative of functionality to perform various management tasks for the hybrid memory device 110. The device controller 116, for example, can serve as a memory controller for the memory 112, such as for handling read and write operations for the memory 112. The device controller may handle input/output (I/O) operations for the storage 114. A variety of other tasks may be performed by the device controller 116, such as wear leveling for the storage 114, power management, error handling, event reporting and/or processing, and so on.

The power source 118 is representative of a power source for the hybrid memory device 110. For instance, the power supply can provide power to the hybrid memory device 110, such as when power to the computing device 102 is lost. Examples of the power source 118 include a battery, a capacitor, and/or any other suitable mechanism and/or device for power storage.

Thus, as illustrated the hybrid memory device 110 is configured as an integrated device with volatile memory, non-volatile memory, and a power supply. According to various embodiments, data that resides on the memory 112 can be written to the storage 114 to enable persistent storage of the data. While the computing device 102 is illustrated with a single hybrid memory device 110, it is to be appreciated that embodiments can employ multiple instances of the hybrid memory device 110. Further implementations and details concerning the hybrid memory device 110 are discussed below.

Further illustrated is a block storage object 120, which is representative of a logical abstraction of the hybrid memory device 110. The block storage object 120, for example, can be implemented as an instance of a block storage device that represents the hybrid memory device 110 and/or multiple hybrid memory devices. Thus, the block storage object 120 can function as a representation of the hybrid memory device 110 to other entities of the computing device 102, such as to enable interaction with the hybrid memory device 110 according to techniques discussed herein.

While the computing device 102 is discussed with reference to a single block storage object 120, it is to be appreciated that block storage objects can be implemented in a variety of different ways to represent various instances and/or combinations of hybrid memory devices. For instance, a single instance of a hybrid memory device can be represented by multiple different block storage objects. As another example, multiple block storage objects can represent a single hybrid memory device. Thus, various combinations of block storage objects and hybrid memory devices may be employed in accordance with the claimed embodiments.

The computing device 102 further includes a memory device driver 122, which is representative of functionality to perform various aspects of the techniques for block storage using a hybrid memory device discussed herein. The memory device driver 122, for example, can enable interaction by other resources of the computing device 102 with the hybrid memory device 110. The memory device driver 122, for example, may enable read/write operations for the memory 112, such as from software and/or hardware of the computing device 102. Further functionalities of the memory device driver 122 are detailed below.

Further included are a device table module 124, a bus driver module 126, and a partition manager module 128. The device table module 124 is representative of functionality to provide information about various resources of the computing device 102. For example, the device table module 124 can include entries (e.g., identifiers) for various devices of the computing device 102, properties for the devices, behavioral characteristics for the devices, and so on. One example implementation of the device table module 124 is an advanced configuration and power interface (ACPI) table. As further detailed herein, the device table module 124 can include an identifier and/or identifiers for the hybrid memory device 110. The device table module 124 may include further information concerning the hybrid memory device 110, such as addressing information, health indicators for the device, performance attributes and/or characteristics, and so forth. Further details and examples of suitable identifiers that may be employed to identify hybrid memory devices are discussed below.

The bus driver module 126 is representative of functionality to enumerate resources tracked by the device table module 124. For example, the bus driver module 126 can provide information about available devices from the device table module 124, can read identifiers for the devices and provide the identifiers to other resources and/or processes, and can create device objects for instances of the devices that enable the devices to be accessed by other resources. One example implementation of the bus driver module 126 is an ACPI bus driver.

The partition manager module 128 is representative of functionality to manage logical partitions of data storage devices of the computing device 102. For example, partition manager module 128 can enable logical storage partitions associated the storage 114 to be configured and reconfigured.

The computing device 102 further includes a display device 130, which is configured to output graphics for the computing device 102. For instance, the hybrid memory device 110 can be exposed to a user as an available storage device for the computing device 102. Thus, in at least some embodiments, a user can store data to and/or retrieve data from the hybrid memory device 110 (e.g., from the storage 114), such as via selection of a graphical representation of the hybrid memory device 110 displayed on the display device 130. Further details concerning implementation and management of the hybrid memory device 110 are discussed below.

Having described an example environment in which the techniques described herein may operate, consider now an example identification scheme for identifying hybrid memory devices in accordance with one or more embodiments.

Identification Scheme

In at least some embodiments, a custom identification scheme can be implemented to enable hybrid memory devices to be discovered and exposed to various resources. For example, the device table module 124 discussed above can include an identifier and/or identifiers for the hybrid memory device 110 that enable the hybrid memory device 110 to be exposed to and accessed by various entities. While a variety of identification schemes can be employed, the following is one example of an identification scheme in accordance with one or more embodiments.

In embodiments that utilize a single hybrid memory device as an instance of a logical storage device, the following scheme can be employed:

Hardware identifier: XXXXYYYYYYYY, where XXXX is the American Standard Code for Information Interchange (ASCII) representation of bytes 117-118 of serial presence detect (SPD) available on a hybrid memory device. Typically, bytes 117-118 contain a manufacturer's Joint Electron Devices Engineering Council (JEDEC) ID code. YYYYYYYY is the ASCII representation of the CRC32 hex value of bytes 128-145 in the SPD of a hybrid memory device. Typically, bytes 128-145 include a part number for a hybrid memory device.

Logical identifier: ZZZZZZZZ, where ZZZZZZZZ is the ASCII representation of the CRC32 hex value of bytes 117-125 in the SPD of the hybrid memory device. Bytes 117-125 are typically defined in a JEDEC standard as being specific to a given supplier.

In embodiments that utilize multiple hybrid memory devices as part of a single instance of a logical storage device, the following scheme can be employed:

Hardware identifier: HMDxxxxxxxx, where xxxxxxxx is the ASCII representation of the CRC32 hex value generated from a concatenation of bytes 128-145 in the SPD from each of the hybrid memory devices represented by the logical storage device, and based on hybrid memory device slot order as installed on a computing device. Typically, CRC32 hex value is most significant bit (MSB) first, and then slot order is from lowest number to highest number.

Logical identifier: YYYYYYYY, where YYYYYYYY is the ASCII representation of the CRC32 hex value generated from a concatenation of bytes 117-125 in the SPD of the hybrid memory devices represented by the logical storage device and based on the hybrid memory devices slot order. Typically, CRC32 hex value is most significant bit (MSB) first, and then slot order is from lowest number to highest number.

Thus, this example identification scheme can be implemented to generate identifiers for instances and/or groups of hybrid memory devices according to techniques discussed herein.

Having described an example identification scheme, consider now some example procedures in accordance with one or more embodiments.

Example Procedures

The following discussion describes some example procedures for block storage using a hybrid memory device in accordance with one or more embodiments. The example procedures may be employed in the environment 100 of FIG. 1, the system 800 of FIG. 8, and/or any other suitable environment.

Figure 2:
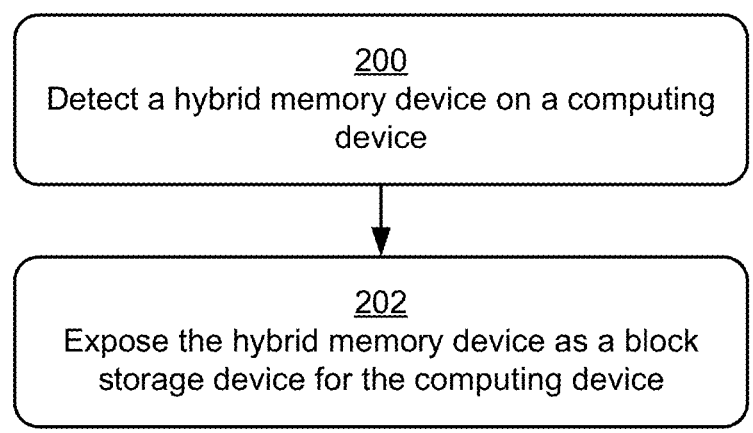
FIG. 2 is a flow diagram that describes steps in a method in accordance with one or more embodiments.

FIG. 2 is a flow diagram that describes steps in a method in accordance with one or more embodiments. According to at least some embodiments, the method describes an example way for implementing a hybrid memory device (e.g., an NVDIMM) as a block storage device.

Step 200 detects a hybrid memory device on a computing device. As described above, a hybrid memory device can include both volatile memory (e.g., DRAM) and non-volatile memory (e.g., flash) integrated on a single device, such as a single expansion card that can be installed on a computing device. Example ways for detecting a hybrid memory device are detailed below.

Step 202 exposes the hybrid memory device as a block storage device for the computing device. The hybrid memory device, for instance, can be exposed to other processes as an available block storage device. Examples of such processes include services, applications, devices, and so on. In at least some embodiments, the hybrid memory device can be exposed to users as an available block storage device such that users can write data to and/or read data from the hybrid memory device. Users and/or processes can access various information about a hybrid memory device, such as an amount of storage space used, an amount of storage space available, information about corrupt and/or unusable portions of storage, and so on. Example ways for exposing a hybrid memory device as block storage are discussed below.

Figure 3:
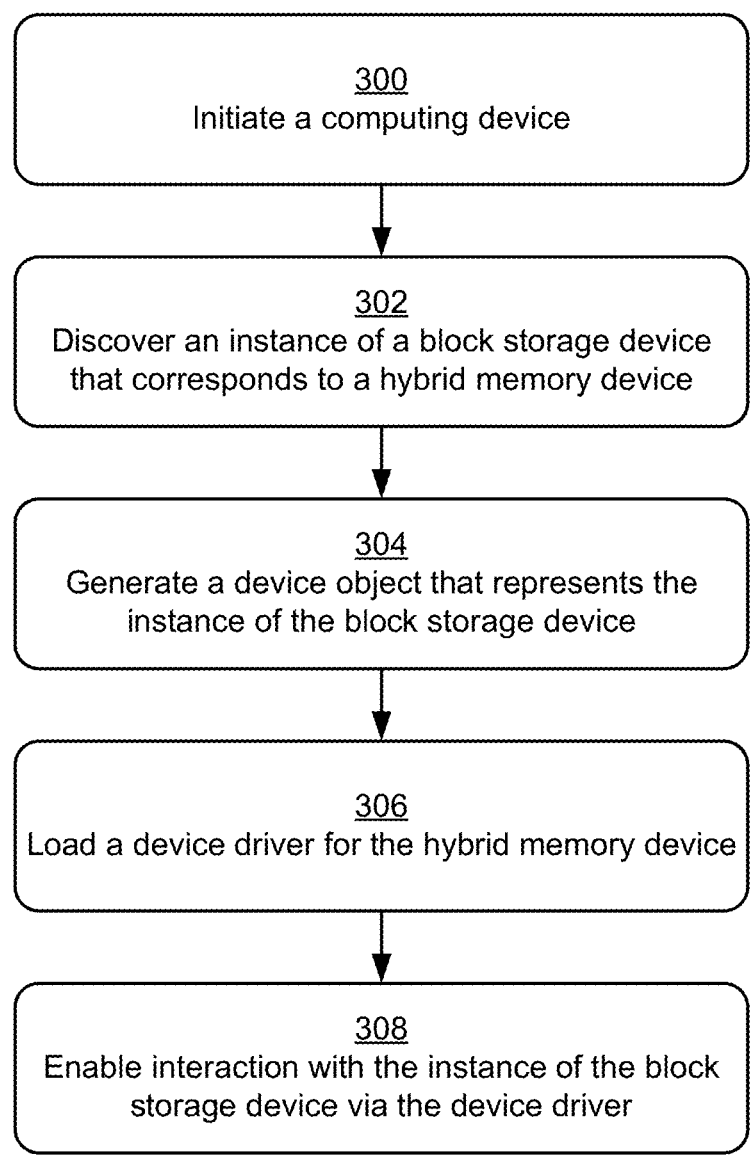
FIG. 3 is a flow diagram that describes steps in a method in accordance with one or more embodiments.

FIG. 3 is a flow diagram that describes steps in a method in accordance with one or more embodiments. In at least some embodiments, the method presents a detailed implementation of the method described above with reference to FIG. 2.

Step 300 initiates a computing device. The computing device 102, for instance, can be powered on and a boot process can be initiated.

Step 302 discovers an instance of a block storage device that corresponds to a hybrid memory device. The bus driver module 126, for example, can discover an entry in the device table module 124 that corresponds to the block storage device. The entry can include an identifier for the hybrid memory device, such as one or more identifiers generated according to the identification scheme referenced above. In at least some embodiments, the instance of the block storage device can correspond to a single instance of a hybrid memory device, or multiple instances of hybrid memory devices that are combined under a single representation. Additionally or alternatively, multiple instances of a block storage device can correspond to a single instance of a hybrid memory device. Thus, various combinations of mappings between block storage devices and hybrid memory devices can be employed.

Step 304 generates a device object that represents the instance of the block storage device. One example of a device object is the block storage object 120 introduced above. In at least some embodiments, the device object is an abstract data representation of a block storage device that can enable access to the block storage device. A device object, for instance, can include interfaces that can be accessed by various devices and/or processes to interact with a block storage device.

Step 306 loads a device driver for the hybrid memory device. The operating system 108, for example, can detect that the device object has been generated, and can load the memory device driver 122 in response. As referenced above, the memory device driver 122 can enable access to the hybrid memory device 110, such as for writing data to the memory 112 and/or the storage 114. The memory device driver 122 may also enable access to the device controller 116, such as to determine state conditions for the hybrid memory device 110.

Step 308 enables interaction with the instance of the block storage device via the device driver. Various devices, processes, and/or users, for example, can read data from and/or write data to the block storage device via the device driver. A wide variety of interactions with a block storage device can be implemented, examples of which are discussed below.

Thus, techniques discussed herein enable data to be written to and/or read from a hybrid memory device via block storage semantics. For instance, data sent from other portions of the computing device 102 to the hybrid memory device 110 can be stored in the hybrid memory device 110 via logical block addressing techniques. Data may also be retrieved from the hybrid memory device via logical block addressing techniques. Thus, logical block addressing can be utilized for storing data to and retrieving data from a hybrid memory device, that is, alternatively to utilizing memory addressing techniques typically employed for data transactions with a memory resource. In at least some embodiments, the memory device driver 122 can employed to perform logical block addressing techniques for the hybrid memory device 110.

In at least some embodiments, techniques discussed herein can be employed to deal with error conditions and/or malfunctions associated with a hybrid memory device. For example, notification events can be defined for a hybrid memory device that can signify different types of error conditions. A device driver for a hybrid memory device can recognize the various notification events, and can take appropriate actions based on the events. For example, consider the following method.

Figure 4:
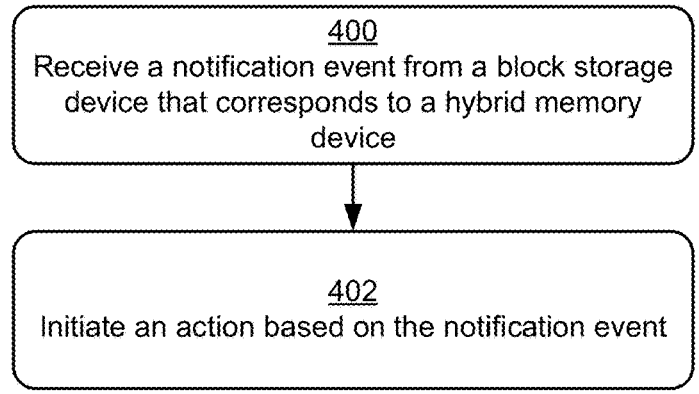
FIG. 4 is a flow diagram that describes steps in a method in accordance with one or more embodiments.

FIG. 4 is a flow diagram that describes steps in a method in accordance with one or more embodiments. Step 400 receives a notification event from a block storage device that corresponds to a hybrid memory device. The memory device driver 122, for example, can receive a notification event from the hybrid memory device 110, such as from the device controller 116.

Various types of notification events can be implemented. One example of a notification event is a hardware error event associated with a hybrid memory device. For example, a power source error can be detected that indicates that an onboard power source (e.g., the power source 118) has failed or is about to fail. Other example notification events can correspond to environmental conditions, such as an internal temperature of a hybrid memory device exceeding a threshold temperature. A variety of different notification events can be implemented in accordance with the claimed embodiments.

Step 402 initiates an action based on the notification event. For example, in response to a notification of an impending failure of the hybrid memory device 110, data from the memory 112 can be written to the storage 114 such that the data can persist after a power loss. A diagnostic routine may also be initiated to determine a cause of the failure and to determine if a fix for the failure is available. A user notification may also be generated (e.g., a visual notification, audible notification, and so on) such that a user can initiate data preservation procedures to avoid loss of data.

In an example implementation where multiple hybrid memory devices are available on a system, an error event associated with one of the hybrid memory devices can initiate a replacement procedure. For example, a logical representation of a failing hybrid storage device (e.g., the block storage object 120) can be remapped from the failing hybrid storage device to a different functioning hybrid storage device. Data from the failing hybrid storage device may also be written to a functioning hybrid storage device and/or other storage device such that the data can be preserved. In at least some embodiments, this can enable processes that are interacting with the failing hybrid storage device to continue the interactions with a replacement device.

In at least some embodiments, techniques discussed herein can be employed to proactively monitor various conditions of a hybrid memory device. For example, methods can be defined that enable hybrid memory devices to be queried for various state information, e.g., via the block storage object 120. For instance, consider the following method.

Figure 5:
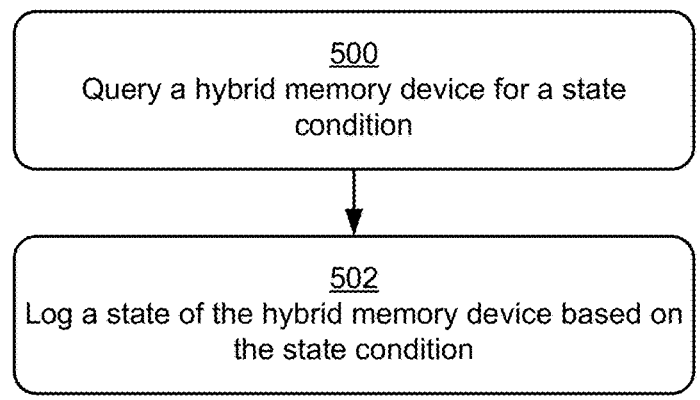
FIG. 5 is a flow diagram that describes steps in a method in accordance with one or more embodiments.

FIG. 5 is a flow diagram that describes steps in a method in accordance with one or more embodiments. Step 500 queries a hybrid memory device for a state condition. Examples of a state condition include a number of power failures that have occurred on the hybrid memory device, a current temperature of the hybrid memory device, a current charge level of a power source of the hybrid memory device, and so on. In at least some embodiments, a device controller for a hybrid memory device can track state information, and can thus respond to queries for state information.

Step 502 logs a state of the hybrid memory device based on the state condition. According to various embodiments, logs of state conditions can be monitored to detect trends associated with hybrid memory devices. For example, if a power source for a hybrid memory device is continually undercharged, this can indicate that the power source is in danger of failing. As another example, if the temperature within a hybrid memory device exceeds a threshold temperature for a particular period of time, this can indicate a potential failure of the hybrid memory device. A variety of other state conditions can be logged, such as a number of read/write operations that have occurred during a particular period of time, an average amount of data stored in non-volatile storage, wear-leveling procedures that have been implemented, and so on.

In at least some embodiments, techniques discussed herein can be employed to preserve data from a computing device via a hybrid memory device, such as in a failure scenario. For example, consider the following method.

Figure 6:
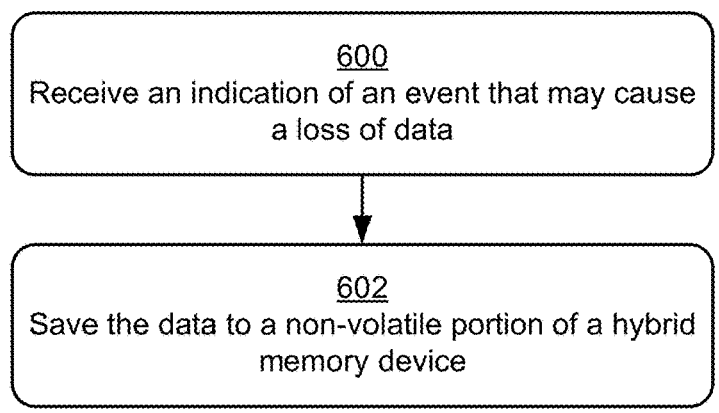
FIG. 6 is a flow diagram that describes steps in a method in accordance with one or more embodiments.

FIG. 6 is a flow diagram that describes steps in a method in accordance with one or more embodiments. Step 600 receives an indication of an event that may cause a loss of data. For instance, a process (e.g., one of the applications 106) can detect a current and/or imminent computing device error condition, such as a failure of a power source, a device failure, a software crash, and so forth. The data can include data that resides externally to the hybrid memory device 110 (e.g., on a memory of the computing device 102), and/or data that resides on the hybrid memory device 110 itself, such as on the memory 112. In at least some embodiments, the data can include a description of a volatile state of hardware of a computing device, such as other storage devices, other memories, processors (e.g., a graphics processing unit (GPU)), and so forth.

Step 602 saves the data to a non-volatile portion of a hybrid memory device. For example, in response to the indication of the event, data that resides on a volatile memory can be read from the volatile memory and saved to a non-volatile data storage of a hybrid memory device. With reference to the computing device 102, for instance, data that resides on a memory of the computing device and/or the memory 112 of the hybrid memory device 110 can be written to the storage 114.

Thus, in at least some embodiments, data that is saved to a hybrid memory device prior to a computing device failure can be retrieved, such as when the computing device recovers from the failure condition. The retrieved data can be accessed to recover various aspects of a failed device, such as device state, application state, file state, and so on, that existed prior to the failure.

Alternatively or additionally, the data may include an image of memory prior to a hardware and/or software failure, such as a portion and/or portions of memory being utilized when the failure occurred. Thus, the data can be accessed to perform diagnostic and/or repair procedures to software and/or hardware to prevent future errors and/or failures.

For instance, consider a scenario where a failure is detected on the computing device 102. An image of portions of memory of the computing device 102 (e.g., not the hybrid memory device 110) can be written to the hybrid memory device 110 and stored on the storage 114. One example implementation of a memory image is a crash dump that occurs in response to a failure scenario. The image can be subsequently accessed to diagnose a cause of the failure and to implement repair procedures to prevent future occurrence of the failure. In at least some embodiments, the hybrid memory device 110 is physically removable from the computing device 102 such that the hybrid memory device 110 can be connected to a different device to retrieve data stored thereon.

In at least some embodiments, techniques discussed herein can be employed to leverage a hybrid memory device to provide a bootable platform for running a computing device. For example, consider the following example method.

Figure 7:
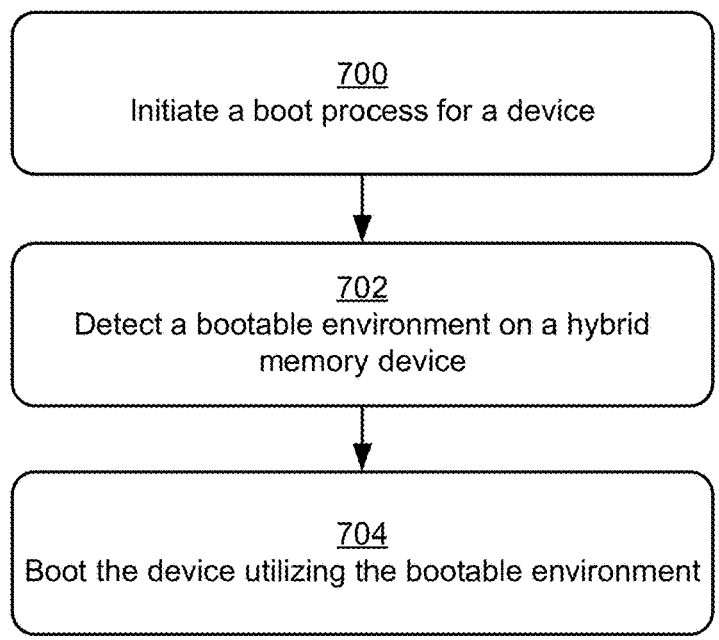
FIG. 7 is a flow diagram that describes steps in a method in accordance with one or more embodiments.

FIG. 7 is a flow diagram that describes steps in a method in accordance with one or more embodiments. Step 700 initiates a boot process for a device. For example, the computing device 102 could be powered-on from a power off state, restarted, and so forth. In a restart scenario, the computing device 102 can be restarted in response to a device error condition, such as an operating system crash, an application crash, a device failure, and so on.

Step 702 detects a bootable environment on a hybrid memory device. For example, a basic input/output system (BIOS) of a computing device can detect the bootable environment (e.g., an operating system) stored on a hybrid memory device.

Step 704 boots the device utilizing the bootable environment. For instance, an operating system can be loaded into memory from storage on the hybrid memory device, and can be utilized to operate the device in a running scenario.

As one example implementation, consider a scenario where a BIOS for the computing device 102 detects an error with the operating system 108, e.g., during a boot process. In response, the BIOS can automatically load an operating system stored on the storage 114 of the hybrid memory device 110 and utilize the operating system to run the computing device 102. Diagnostic processes can be implemented to determine the nature of the error condition of the operating system 108, and accordingly repair and/or replace the operating system 108. Thus, an operating system stored on the hybrid memory device 110 can provide a backup boot environment that can be utilized if a primary boot environment fails.

As another example implementation, consider a scenario where a malicious process is detected on the computing device 102, such as malware. In response to detecting the malicious process, a functionality such as security software can restart and/or reboot the computing device 102, and load a boot environment from the hybrid memory device 110. In at least some embodiments, this can enable various aspects of a system to be isolated and inspected to identify a source of the malicious process, such that the source can be repaired and/or removed to prevent the malicious process from subsequently occurring. Thus, a bootable environment stored on the hybrid memory device 110 can be leveraged to run security and/or diagnostic processes to locate and repair various functionalities of the computing device 102.

Having discussed some example procedures, consider now a discussion of an example system and device in accordance with one or more embodiments.

Example System and Device

Figure 8:
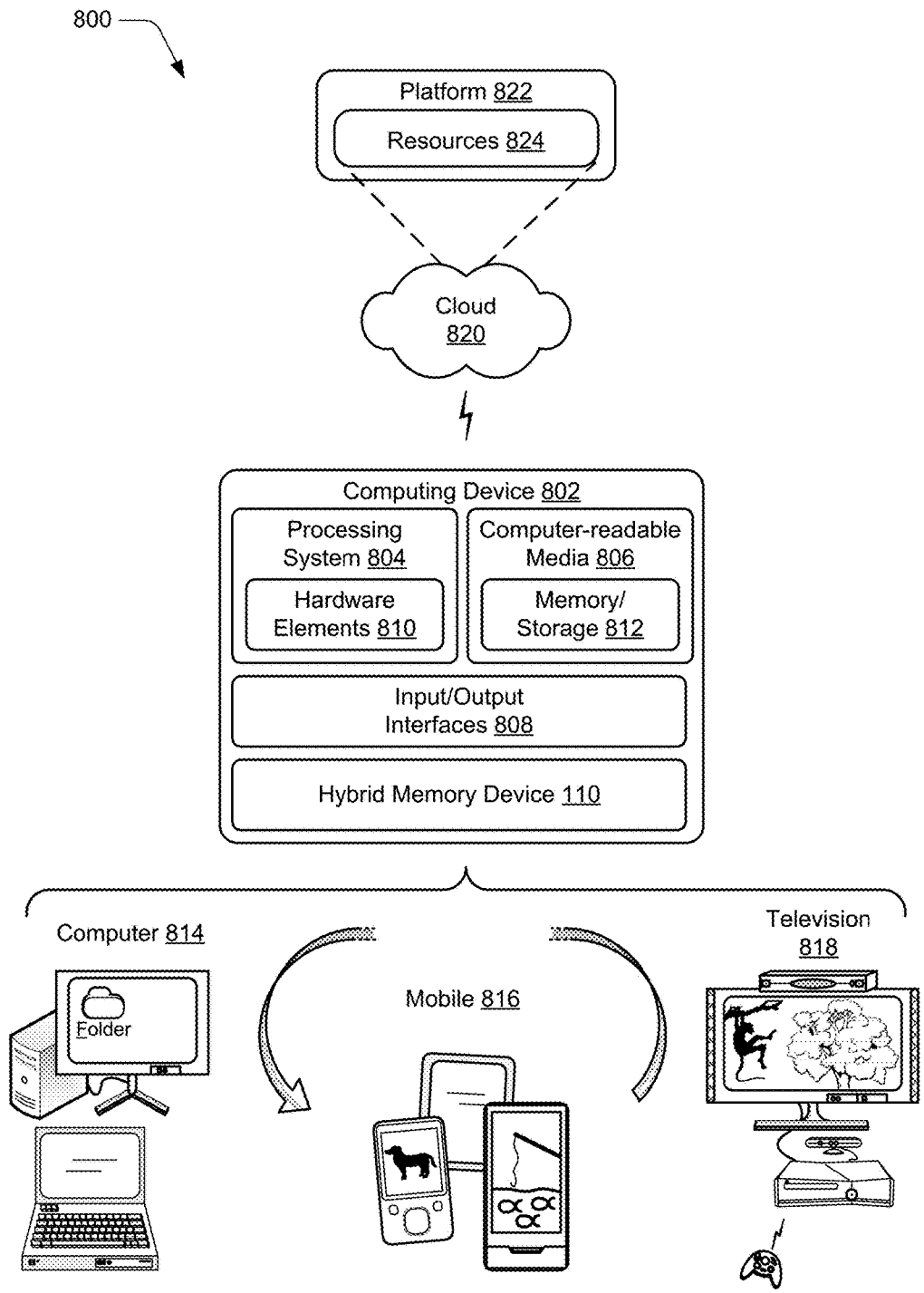
FIG. 8 illustrates an example system and computing device as described with reference to FIG. 1, which are configured to implement embodiments of techniques described herein.

FIG. 8 illustrates an example system generally at 800 that includes an example computing device 802 that is representative of one or more computing systems and/or devices that may implement various techniques described herein. For example, the computing device 102 discussed above with reference to FIG. 1 can be embodied as the computing device 802. The computing device 802 may be, for example, a server of a service provider, a device associated with the client (e.g., a client device), an on-chip system, and/or any other suitable computing device or computing system.

The example computing device 802 as illustrated includes a processing system 804, one or more computer-readable media 806, and one or more Input/Output (I/O) Interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 810 and computer-readable media 806 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of modules that are executable by the computing device 802 as software may be achieved at least partially in hardware, e.g., through use of computer-readable storage media and/or hardware elements 810 of the processing system. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 802 may assume a variety of different configurations, such as for computer 814, mobile 816, and television 818 uses. Each of these configurations includes devices that may have generally different constructs and capabilities, and thus the computing device 802 may be configured according to one or more of the different device classes. For instance, the computing device 802 may be implemented as the computer 814 class of a device that includes a personal computer, desktop computer, a multi-screen computer, laptop computer, netbook, and so on.

The computing device 802 may also be implemented as the mobile 816 class of device that includes mobile devices, such as a mobile phone, portable music player, portable gaming device, a tablet computer, a multi-screen computer, and so on. The computing device 802 may also be implemented as the television 818 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. For example, functionalities discussed with reference to the hybrid memory device 110 may be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services provided over the Internet and/or through a subscriber network, such as a cellular or Wi-Fi network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device embodiment, implementation of functionality described herein may be distributed throughout the system 800. For example, the functionality may be implemented in part on the computing device 802 as well as via the platform 822 that abstracts the functionality of the cloud 820.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Techniques for block storage using a hybrid memory device are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

The invention claimed is:
1. One or more computer-readable storage media comprising instructions stored thereon that, responsive to execution by a computing device, cause the computing device to perform operations comprising:
  generating a device object that represents an instance of a block storage device, the device object corresponding to at least one hybrid memory device installed on the computing device, the at least one hybrid memory device including at least one volatile memory portion and at least one non-volatile memory portion;
  loading a device driver for the at least one hybrid memory device; and
  rendering a user interface configured to interact with the instance of the block storage device via the device driver and the device object such that data is directly writable to the at least one hybrid memory device via logical block addressing.

2. The computer-readable storage media as recited in claim 1, wherein the at least one hybrid memory device comprises a non-volatile dual in-line memory module device (NVDIMM).

3. The computer-readable storage media as recited in claim 1, wherein said user interface is further configured to enable selection of the block storage device for non-volatile storage of data on the computing device.

4. The computer-readable storage media as recited in claim 1, wherein the operations comprise:
receiving a notification event from the block storage device; and
initiating an action based on the notification event.

5. The computer-readable storage media as recited in claim 4, wherein the notification event indicates at least one of a hardware error or a software error, and the action comprises writing data to the at least one non-volatile memory portion in response to the notification event.

6. The computer-readable storage media as recited in claim 1, wherein the operations comprise:
querying the at least one hybrid memory device for a state condition of the at least one hybrid memory device; and
logging a state of the at least one hybrid memory device based on the state condition.

7. The computer-readable storage media as recited in claim 1, wherein the operations comprise:
receiving an indication of an event that may cause a loss of data for the computing device; and
saving the data to the at least one non-volatile memory portion of the at least one hybrid memory device.

8. A computer-implemented method, comprising:
detecting a hybrid memory device installed on a computing device, the hybrid memory device including at least one volatile memory portion and at least one non-volatile memory portion integrated on a single device;
exposing the hybrid memory device as one or more available block storage devices, such that data is writable via a device driver to the hybrid memory device via logical block addressing; and
enabling access to information about the hybrid memory device, including one or more of an amount of storage space used, an amount of storage space available, or one or more corrupt or unusable portions of storage of the hybrid memory device.

9. The method as described in claim 8, further comprising:
receiving a notification of an error condition for the computing device; and
causing data from the computing device to be stored on the at least one non-volatile memory portion of the hybrid memory device such that the data can be recovered in an event that the computing device loses the data.

10. The method as described in claim 9, wherein the data comprises at least one of an image of one or more portions of a volatile memory of the computing device, or a volatile state of one or more instances of hardware of the computing device.

11. The method as described in claim 8, further comprising detecting a different hybrid memory device installed on the computing device, wherein said exposing comprises exposing the hybrid memory device and the different hybrid memory device as a single instance of the available block storage device.

12. The method as described in claim 8, further comprising:
querying the hybrid memory device for one or more state conditions of the hybrid memory device; and
initiating one or more actions based on the state conditions.

13. The method as described in claim 8, further comprising:
initiating a boot process for the computing device;
detecting a bootable environment stored on the hybrid memory device; and
booting the computing device using the bootable environment from the hybrid memory device.

14. A system comprising:
at least one processor;
one or more computer-readable storage media including instructions stored thereon that, responsive to execution by the at least one processor, cause the system to perform operations including:
generating a device object that represents an instance of a block storage device that corresponds to at least one hybrid memory device installed, the at least one hybrid memory device including at least one volatile memory portion and at least one non-volatile memory portion;
loading a device driver for the at least one hybrid memory device; and
rendering an interface indicative of the at least one hybrid memory device, the interface operable to initiate interaction with the instance of the block storage device via the device driver and the device object such that data is writable to the at least one hybrid memory device via logical block addressing.

15. The system as described in claim 14, wherein the at least one hybrid memory device comprises a non-volatile dual in-line memory module device (NVDIMM).

16. The system as described in claim 14, wherein said interface is further operable to enable selection of the block storage device for non-volatile storage of data.

17. The system as described in claim 14, wherein the operations further comprise:
receiving a notification event from the block storage device; and
initiating an action based on the notification event.

18. The system as described in claim 17, wherein the notification event indicates at least one of a hardware error or a software error, and the action comprises writing data to the at least one non-volatile memory portion in response to the notification event.

19. The system as described in claim 14, wherein the operations further comprise:
querying the at least one hybrid memory device for a state condition of the at least one hybrid memory device; and
logging a state of the at least one hybrid memory device based on the state condition.

20. The system as described in claim 14, wherein the operations further comprise:
receiving an indication of an event that may cause a loss of data; and
saving the data to the at least one non-volatile memory portion of the at least one hybrid memory device.

* * * * *